Jan. 18, 1938.  A. M. ZAMBORSKY  2,106,045
FISHING DEVICE
Filed Aug. 14, 1936

INVENTOR.
Andrew M. Zamborsky.
BY
Geo. B. Pitts
ATTORNEY.

Patented Jan. 18, 1938

2,106,045

UNITED STATES PATENT OFFICE 2,106,045

FISHING DEVICE

Andrew M. Zamborsky, Cleveland, Ohio

Application August 14, 1936, Serial No. 96,087

8 Claims. (Cl. 43—52)

This invention relates to a fishing device, more particularly a sinker adapted to be connected to a fishing line.

One object of the invention is to provide a device of this character of novel shape whereby it is guided by and through the water when a pull is exerted on the fishing line without danger of wiggling or being caught between the walls of rocks.

Another object of the invention is to provide an improved device of this character so constructed, when resting on the bottom of a body of water, that any tendency of existing currents or wave motion will be ineffective to move the device.

Other objects of the invention will be apparent to those skilled in the art to which my invention relates from the following description taken in connection with the accompanying drawing, wherein.

Figure 1:
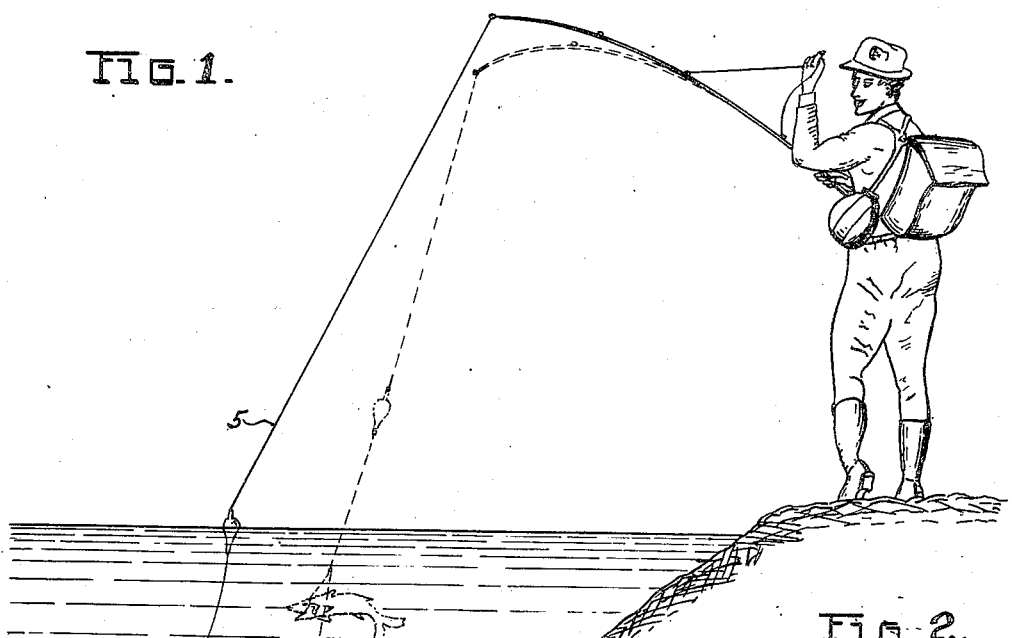
Fig. 1 is a perspective view of a fishing line, equipped with a device embodying my invention, and showing one way of employing the device.
Figure 2:
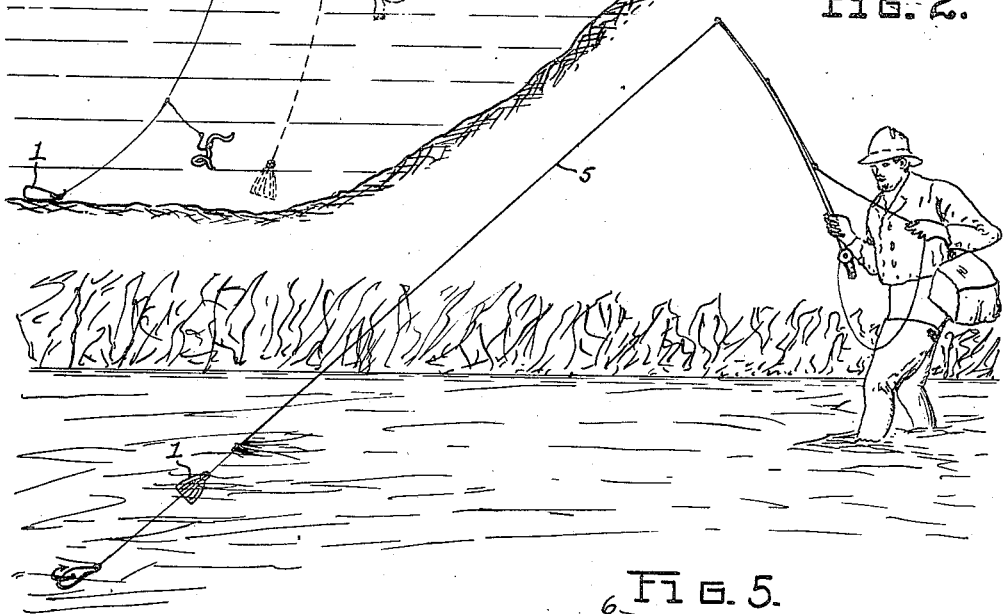
Fig. 2 is a perspective view showing a different use of the device in fishing.
Figure 3:
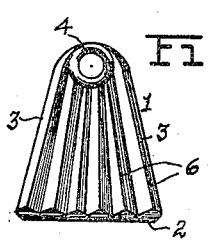
Fig. 3 is an elevation of the device.
Figure 4:
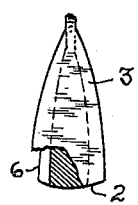
Fig. 4 is an end elevation, parts being broken away.
Figure 5:
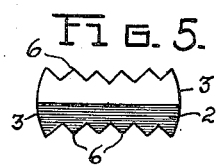
Fig. 5 is a bottom plan view.

In the drawing, 1 indicates as an entirety the device cast from suitable material, such as lead or lead alloy, and adapted to be attached to a fishing line. The device is shaped to form a body, which is elongated in the direction of pull on the line when the device is in use and elongated in a direction at right angles thereto, to provide relatively wide sides, a bottom wall 2 of substantially rectangular shape and converging end walls 3, the upper end portion being formed with a transverse opening 4, whereby the device may be suitably connected to a fishing line 5. The bottom wall 2 and end walls 3 may be of curvilinear shape. Between the end walls 3, the opposite sides of the device are provided with a series of ribs 6 (each being preferably V-shape in cross section) which preferably have a converging relation from the bottom wall 2 upwardly, the grooves between the ribs being unobstructed and open at their outer ends. As shown in Fig. 5, the free edges of the ribs 6 and end walls 3 on each side of the device are disposed on an imaginary curved line, preferably a concave line and the upper portions of the ribs are curved inwardly so that the upper end of the device terminates as a relatively sharp end, the convergence of the end walls 3 and ribs 6 serving to facilitate the movement of the device through the water when the line 5 is being pulled in or reeled. The end walls 3 and ribs 6 serve to guide the device in the direction of the pull on the line, so that danger of the device wiggling or twisting in the water about the line is eliminated. Furthermore, by disposing the outer edges of the ribs and end walls on concave lines, the outermost ribs, and end walls, tend to prevent the escape of the water laterally and as the ribs have a converging relation, the action of the water on the surfaces of the grooves between the ribs and end walls tends to guide the device in the direction of the pull on the line 5, as shown in Fig. 2. Where the device is permitted to rest on the bottom of the body of water, the ribs 6, and end walls 3, engage the bottom and hold the device against movement due to any existing current or wave motion. Where the hook is cast and the line is drawn in, as shown in Fig. 2, the action of the water on the walls and ribs of the device cause it to move through the water in a steady path so that danger of causing jerks and abnormal movements of the hook and line associated therewith, is avoided. The shape of the sides and end walls of the device serves to permit ready disengagement of the device from any rocks that may be present in the body of water.

From the foregoing description, it will be seen that the device is elongated in the direction of pull on the line 5 and also at right angles thereto when the device is in use, so that it constitutes a substantially flat member and that its surfaces have a converging relation towards that end which is connected to the fishing line, to facilitate the movement of the device through the water; also, that the sides of the device are provided with ribs and grooves extending substantially in the direction of pull on the fishing line so that the action of the water on the resulting surfaces tends to guide the device and prevent lateral or twisting movements thereof.

To those skilled in the art to which my invention relates many changes in construction and widely differing embodiments and applications of the invention will suggest themselves without departing from its spirit and scope. My disclosures and the description herein are purely illustrative and not intended to be in any sense limiting.

What I claim is:

1. A device of the character set forth comprising an elongated body having sides and end walls converging toward its upper end and formed in its upper end portion with an opening, one side of said body being provided with ribs extending substantially in the direction of pull on said device.

2. A device of the character set forth comprising an elongated body having sides and end walls converging toward its upper end and formed in its upper end portion with an opening, one side of said body being provided with ribs extending substantially in the direction of pull on said device, and having a converging relation toward the upper end of said device.

3. A device of the character set forth comprising an elongated body having sides and end walls converging toward its upper end and formed in its upper end portion with an opening, one side of said body being provided with ribs extending substantially in the direction of pull on said device, the free edges of said ribs in a direction transversely thereof being disposed on an imaginary curved line.

4. A device of the character set forth comprising an elongated body having sides and end walls converging toward its upper end and formed in its upper end portion with an opening, one side of said body being provided with ribs extending substantially in the direction of pull on said device, and having a converging relation toward the upper end of said device, and the free edges of said ribs in a direction transversely thereof being disposed on an imaginary curved line.

5. A device of the character set forth comprising an elongated body having sides and end walls converging toward its upper end and formed in its upper end portion with an opening, one side of said body being provided with ribs extending substantially in the direction of pull on said device, the free edges of said ribs in a direction transversely thereof being disposed on an imaginary concave line.

6. A device of the character set forth comprising a body formed with an opening in its upper end and elongated in a direction at right angles to the direction of pull of said body when in use, to provide relatively wide side faces and narrow end walls, one of said side faces being provided with a rib extending substantially in the direction of pull on said device.

7. A device as claimed in claim 6 wherein each side face is provided with a plurality of ribs extending substantially in the direction of pull on said device.

8. A device of the character set forth comprising a body formed with an opening in its upper end and elongated in the direction of pull on said body and at right angles thereto when in use, to provide relatively wide side faces, a bottom and narrow end walls, said end walls converging toward their upper ends and said opposite side faces being provided adjacent said converging end walls with ribs extending substantially from the bottom to the opening.

ANDREW M. ZAMBORSKY.